United States Patent [19]
Moser

[11] 3,746,145
[45] July 17, 1973

[54] BUCKET UNIT
[75] Inventor: Hermann Moser, Darmstadt, Germany
[73] Assignee: Kalle Aktiengesellschaft, Weisbaden-Biebrich, Germany
[22] Filed: Aug. 10, 1971
[21] Appl. No.: 170,472

[30]    Foreign Application Priority Data
        Aug. 13, 1970  Germany............... P 20 40 292.0

[52] U.S. Cl. .............................................. 198/140
[51] Int. Cl............................................. B65g 17/12
[58] Field of Search.................. 198/140, 151, 152; 118/637

[56]           References Cited
            UNITED STATES PATENTS
    867,817  10/1907  Girton................................. 198/140
  1,005,282  10/1911  Murray............................... 198/151

Primary Examiner—Edward A. Sroka
Attorney—James E. Bryan

[57]                ABSTRACT

This invention relates to an improvement in a bucket unit comprising a bucket chain, a drive shaft with a pair of drive wheels and a guide shaft with two guide wheels. The improvement comprises a plurality of parallel buckets connected with adjacent buckets by two pairs of substantially ring-shaped means passed through bores in the bucket walls, whereby a closed bucket chain is obtained.

6 Claims, 3 Drawing Figures

INVENTOR
HERMANN MOSER

INVENTOR
HERMANN MOSER

ATTORNEY

BUCKET UNIT

This invention relates to a bucket unit comprising a bucket chain, a drive shaft with two drive wheels, and a guide shaft with two guide wheels for conveying pulverulent to coarse-grained material, particularly for conveying a developer mixture in a cascade development device for electrophotographic reproduction apparatuses.

Such bucket units are endless conveyors and serve for conveying loose material from a storage vessel, bin or similar storage zone to a delivery zone positioned at a higher level compared with the feed zone; the conveying path is upward and either vertical or slightly inclined with respect to the normal. Filling of the individual bucket, which also may have the form of scoops, tanks or oblong troughs, is performed automatically at the feed zone in that the buckets are drawn by the conveying device (chain, rope, or the like) in an upward direction through the material. After traversing the given difference of level on a usually straight conveying path, the filled buckets run over a pair of guide wheels which simultaneously function as the drive, and are emptied by rotation through 180°. Then, the empty buckets return on a path parallel to the actual conveying path, but in the opposite direction, to the feed zone where, after another rotation through 180°, they are again filled with material.

In electrophotographic reproduction apparatuses with cascade development, the described bucket conveyors are required to convey the developer mixture consisting of carrier grains (sand, glass or metal globules) and toner powder from a storage vessel to a feed funnel at a higher level, from which the developer mixture flows in the manner of a cascade over the latent image on a photoconductor and from there back into the storage vessel.

For solving the described problem, it is known to provide, in electrophotographic apparatuses, long narrow buckets, having approximately the form of troughs, between two band or ladder chains or toothed belts and to have them run as endless conveying or carrying devices over two pairs of guide wheels, the upper pair of wheels simultaneously having the function of a drive. It is a disadvantage of these bucket units that the developer mixture, i.e., the carrier grains with the toner particles enveloping them, is ground between the chain members or toothed belts and the sprocket-like guide wheels, which necessarily leads to difficulties in image development. Furthermore, it is disadvantageous for the mounting of the hitherto known bucket units that each bucket must be fastened by means of two clips or similar securing devices to the two chains; time-consuming bolting, riveting or welding is unavoidable.

The present invention overcomes the mentioned drawbacks, i.e., it provides a bucket unit in which the developer mixture is not ground and the mounting of which is substantially simplified and thus more economical.

In accordance with the invention, this achieved in that the trough-like parallel buckets are loosely connected at their two ends with adjacent buckets by means of pairs of staples, preferably having a closed oval or elliptical form. The staples are passed through bores in the bucket walls so that a closed bucket chain is obtained.

In order to be able to drive or guide the bucket chain in a trouble-free manner, the bucket unit, in another embodiment of the invention, is equipped with guide or drive wheels having the form of flat circular cylinders the height of which corresponds exactly to the clearance between the two members of a staple pair, the drive wheels additionally being provided with tooth-like cams, preferably cylindrical pins, which are uniformly spaced and radially project from the wheel periphery.

In another embodiment of the invention, the cross-section of the wheels at the circumference thereof changes over into the form of a triangle, a rectangle with a wedge-shaped cutout, a semi-circle or a semi-ellipsoid, in order to minimize the contact between the bucket chain and the guide or drive wheels - and thus the possibility of grinding particles of the developer mixture.

The advantages achieved with the invention are that a bucket unit is obtained with little production expense, in which the carrying and conveying system forms a structural unit without the cumbersome fastening of the individual buckets to the chain by bolting, riveting or welding. Also, sprocket-like drive wheels are used which are produced without the expense usual for machining the teeth, and grinding of the developer particles between the chain and the chain wheels is avoided since there is only one contact between a bucket and a chain wheel and this contact is a point or two-point contact.

An exemplary embodiment of the invention is illustrated in the drawings in which.

Figure 1:
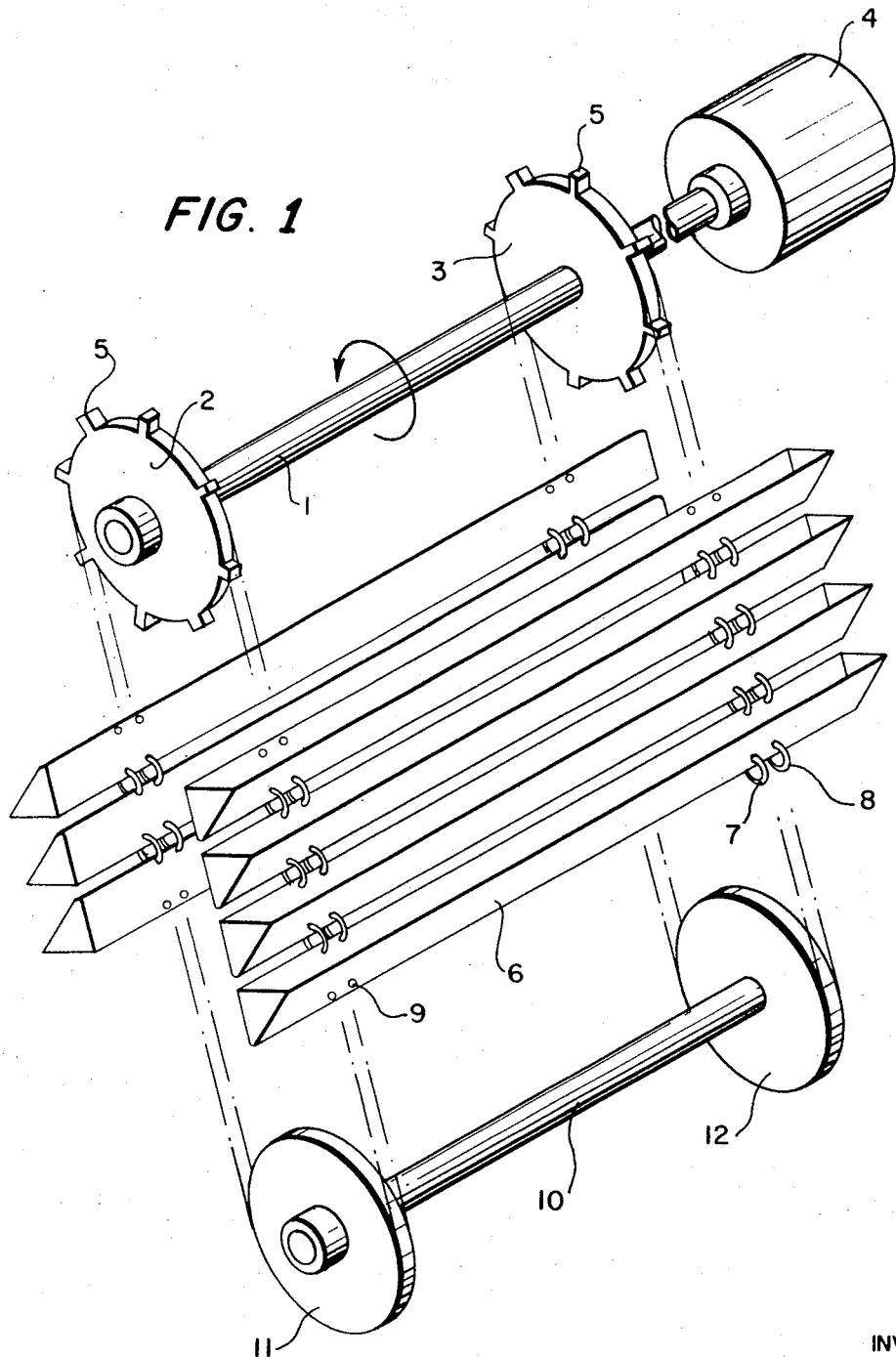
FIG. 1 is a diagrammatic perspective view of the bucket unit.

FIG. 1 shows the drive shaft 1 with the drive wheels 2 and 3, the drive being effected in a manner not described in detail by a drive device 4 such as a motor, also not described in detail. At the drive wheels 2 and 3, are the tooth-like cams 5 projecting radially from the periphery of the wheels and serving for conveying the chain as do the teeth of a sprocket. The bucket chain itself includes the trough-like buckets 6, each of which is loosely connected with adjacent buckets by two pairs of elliptical or oval staples 7,8; the staples are passed through the bores 9 in the bucket walls.

Parallel to the drive shaft 1, there is the guide shaft 10 with the guide wheels 11 and 12 thereon.

Figure 2:
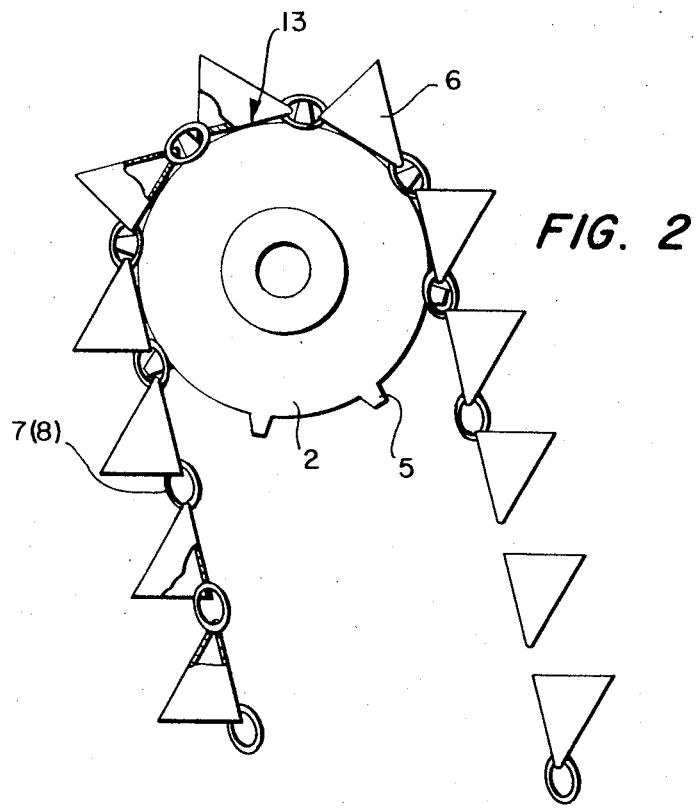
FIG. 2 is a side elevation of a drive wheel during guiding of the bucket chain.

A more detailed description of the operations during guiding of the bucket chain over the guide or drive wheels is shown in FIG. 2. This figure clearly shows that each bucket 6 contacts the wheel 2 only at one point 13. The cams 5 pass, on the one hand, between adjacent buckets and, on the other hand, between the two members 7 and 8 of pairs of staples and thus effect the movement of the bucket chain over the periphery of the wheel. Lateral guidance of the bucket chain is performed in that each pair of staples passes adjacent the right and left hand sides of th wheel disc since the thickness of each wheel disc is identical to the clearance between the two members 7 and 8 of a pair of staples.

Figure 3:
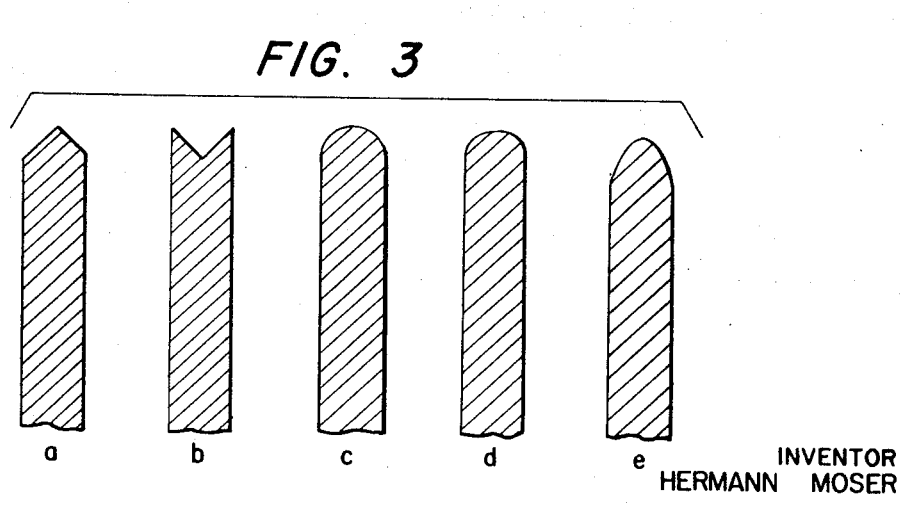
FIG. 3a – e show, by way of example, preferred wheel cross-sections of a guide wheel.

The five examples of FIG. 3 clearly show the different wheel cross-sections at the periphery for achieving the advantageous point contact between the bucket and the chain wheel.

It will be obvious to those skilled in the art that many modifications may be made within the scope of the present invention without departing from the spirit thereof, and the invention includes all such modifications.

What is claimed is:

1. In a bucket unit for conveying a developer mixture in an electrophotographic reproduction apparatus, which unit comprises a bucket chain of parallel buckets in the form of long parallel troughs drivably arranged and guided by drive wheels and by guide wheels, the improvement which comprises substantially ring-shaped means passed through bores in adjacent bucket walls, whereby a closed bucket chain is obtained.

2. A bucket unit according to claim 1 in which the peripheries of the guide and drive wheels have cross-sections in the form of a triangle.

3. A bucket unit according to claim 6 in which the guide and drive wheels have the form of flat circular cylinders, the height of which is identical to the clearance between two members of a pair of said substantially ring-shaped means, and said drive wheels being provided with uniformly spaced tooth-like cams on the peripheries thereof.

4. A bucket unit according to claim 1 in which the peripheries of the guide and drive wheels have cross-sections in the form of a rectangle with wedge-shaped cutout.

5. A bucket unit according to claim 1 in which the peripheries of the guide and drive wheels have cross-sections in the form of a semi-circle.

6. A bucket unit according to claim 1 in which the peripheries of the guide and drive wheels have cross-sections in the form of a semi-ellipsoid.

* * * * *

UNITED STATES PATENT OFFICE
CERTIFICATE OF CORRECTION

Patent No. 3,746,145    Dated July 17, 1973

Inventor(s) Hermann Moser

It is certified that error appears in the above-identified patent and that said Letters Patent are hereby corrected as shown below:

Column 2, line 63, "th" should read - - - the - - -.

Column 4, line 1 of Claim 3, "claim 6" should read - - - claim 1 - - -.

Signed and sealed this 5th day of March 1974.

(SEAL)
Attest:

EDWARD M.FLETCHER,JR.
Attesting Officer

C. MARSHALL DANN
Commissioner of Patents